United States Patent
Shimada (10) Patent No.: US 8,194,427 B2
(45) Date of Patent: Jun. 5, 2012

(54) SWITCHING POWER SUPPLY DEVICE

(75) Inventor: Masaaki Shimada, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 346 days.

(21) Appl. No.: 12/509,925

(22) Filed: Jul. 27, 2009

(65) Prior Publication Data

US 2010/0020575 A1    Jan. 28, 2010

(30) Foreign Application Priority Data

Jul. 28, 2008   (JP) ................................. 2008-193277

(51) Int. Cl.
H02M 3/00    (2006.01)

(52) U.S. Cl. ........................................................ 363/49

(58) Field of Classification Search ............... 363/21.12, 363/21.15, 21.16–21.18, 49, 56.01
See application file for complete search history.

(56) References Cited

U.S. PATENT DOCUMENTS

| | | | | |
|---|---|---|---|---|
| 5,200,886 | A | * | 4/1993 | Schwarz et al. ................. 363/49 |
| 5,640,317 | A | * | 6/1997 | Lei .................................. 363/49 |
| 6,657,877 | B2 | * | 12/2003 | Kashima et al. ............. 363/127 |
| 7,221,128 | B2 | * | 5/2007 | Usui et al. ..................... 323/207 |
| 7,545,657 | B2 | | 6/2009 | Shimada |
| 7,894,219 | B2 | * | 2/2011 | Zong et al. ..................... 363/49 |

FOREIGN PATENT DOCUMENTS

| | | |
|---|---|---|
| CN | 101207333 A | 6/2008 |
| JP | 2003-164150 | 6/2003 |

OTHER PUBLICATIONS

U.S. Appl. No. 12/544,339, filed Aug. 20, 2009, Shimada.
Office Action issued Jul. 6, 2011 in Chinese Patent Application No. 200910160150.8 (with English outline).

* cited by examiner

Primary Examiner — Matthew Nguyen
(74) Attorney, Agent, or Firm — Oblon, Spivak, McClelland, Maier & Neustadt, L.L.P.

(57) ABSTRACT

A switching power supply device includes: a transformer having a primary winding, a secondary winding and an auxiliary winding; a switching element connected to the primary winding of the transformer; a control circuit that performs an ON/OFF control for the switching element in a case where a voltage is inputted to the primary winding of the transformer, thereby induces voltages in the secondary winding and auxiliary winding of the transformer; a rectifying/smoothing circuit for rectifying and smoothing the voltage induced in the secondary winding of the transformer and outputting the voltage to a load; an auxiliary power supply circuit that rectifies and smoothes the voltage induced in the auxiliary winding of the transformer, and charges a capacitor owned by the auxiliary power supply circuit with the voltage to thereby supply power to the control circuit; and a starting circuit that supplies a current to the capacitor of the auxiliary power supply circuit in a case of starting the control circuit and in a case where the load is light and the switching element is turned off.

4 Claims, 7 Drawing Sheets

SWITCHING POWER SUPPLY DEVICE

BACKGROUND OF THE INVENTION

1. Field of the Invention

The present invention relates to a switching power supply device that generates and outputs a predetermined voltage by a switching operation, and is capable of a stable control at a time when a load is light.

2. Description of the Related Art

A switching power supply device that controls an output voltage by performing an ON/OFF control for a switching element has been heretofore used for OA equipment, consumer appliances and the like. In recent years, efficiency enhancement of the switching power supply device has been required from viewpoints of considering the environment and saving energy. A control circuit that controls the switching element in the switching power supply device is usually composed of a one-chip integrated circuit, and includes, in an inside of the integrated circuit, a starting circuit for starting the integrated circuit concerned.

Figure 1:
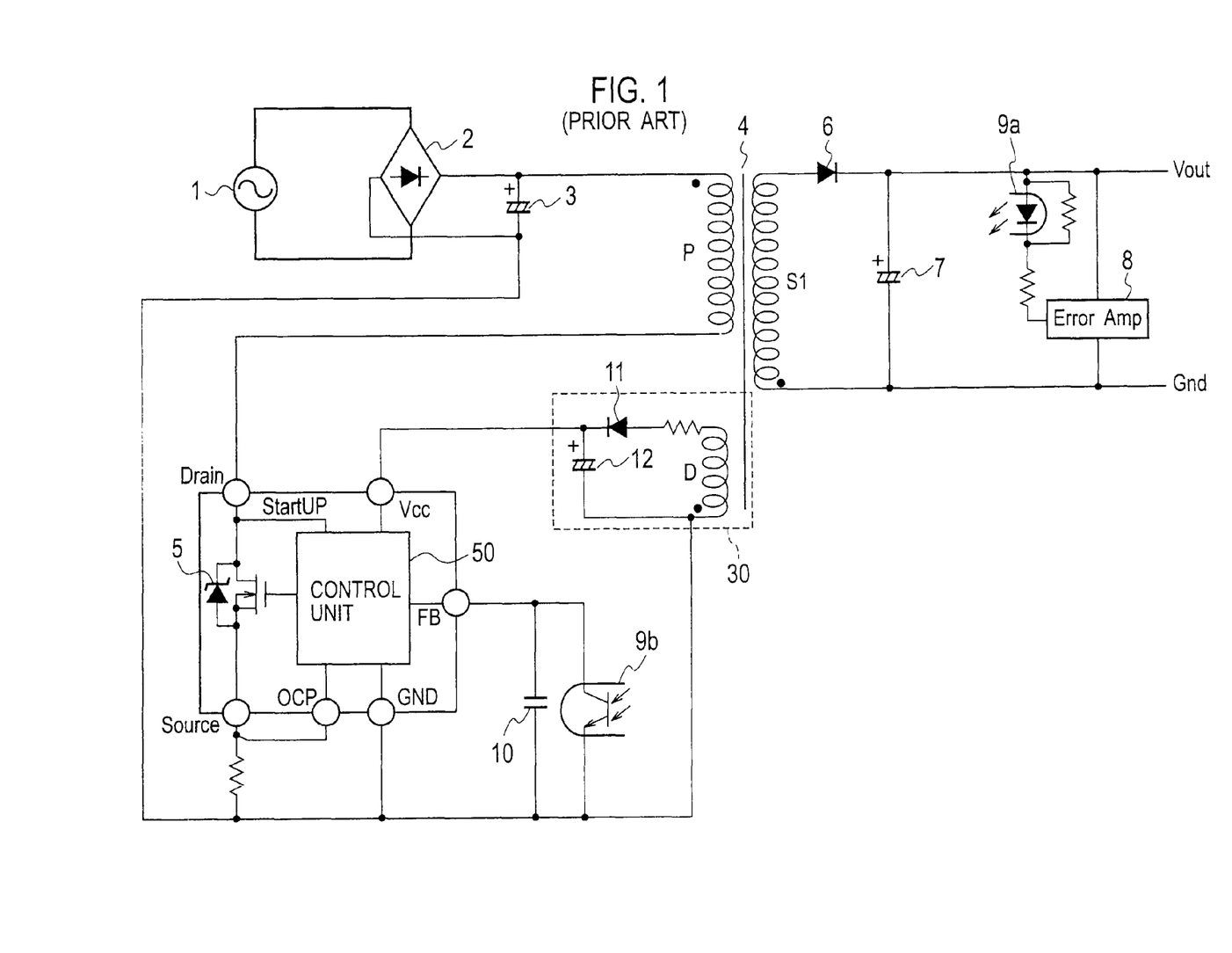
FIG. 1 is a circuit diagram showing a configuration of a conventional switching power supply device.

FIG. 1 is a circuit diagram showing a configuration of a conventional switching power supply device of a flyback type. As shown in FIG. 1, this switching power supply device includes: an alternating current power supply 1; a bridge rectifier 2; a capacitor 3 for a normal filter; a transformer 4; a switching element 5; a rectifying diode 6; an output capacitor 7, an error amplifier 8; a light emitting diode (LED) 9a and phototransistor 9b of a photocoupler; a capacitor 10; an auxiliary power supply circuit 30; and a control unit 50 for controlling the switching element 5.

Moreover, the switching element 5 and the control unit 50 are provided, for example, in a one-chip semiconductor device. Then, the one-chip semiconductor device includes: as external terminals, an input terminal of the switching element 5 (Drain terminal); an output terminal of the switching element 5 (Source terminal); an input terminal of the auxiliary power supply circuit 30 (Vcc terminal); a feedback signal input terminal (FB terminal); an overcurrent protection terminal (OCP terminal); and a ground terminal of the control unit 50 (GND terminal). Note that the control unit 50 includes: a StartUp terminal connected to the Drain terminal; the Vcc terminal; the FB terminal; and the GND terminal; the OCP terminal; and a DRV terminal for outputting a control signal to the switching element 5.

The transformer 4 has a primary winding P, a secondary winding S1 and an auxiliary winding D, and transmits energy from a primary-side circuit of the switching power supply device to a secondary-side circuit thereof. Moreover, the switching element 5 is connected to the primary winding P of the transformer 4.

The error amplifier 8 is connected between an output voltage terminal Vout and a ground terminal Gnd, and controls a current flowing through the LED 9a of the photocoupler in response to a difference between the output voltage (on Vout) and an internal reference voltage of the error amplifier 8 concerned. A resistor is connected in parallel to the LED 9a of the photocoupler, and the LED 9a gives feedback of an error with respect to the reference voltage of the secondary-side circuit of the switching power supply device to the primary-side circuit thereof. Moreover, the phototransistor 9b of the photocoupler operates in response to light of the LED 9a of the photocoupler. A collector of the phototransistor 9b is connected to the FB terminal of the control unit 50, and an emitter thereof is grounded.

The auxiliary power supply circuit 30 is composed by connecting a diode 11 and a backup capacitor 12 to the auxiliary winding D. Moreover, the auxiliary power supply circuit 30 rectifies and smoothes a voltage induced in the auxiliary winding D of the transformer 4, charges the backup capacitor 12 provided in the auxiliary power supply circuit 30, and supplies power to the Vcc terminal of the control unit 50.

A voltage induced in the secondary winding S1 of the transformer 4 during an OFF period of the switching element 5 is rectified and smoothed by the rectifying diode 6 and the output capacitor 7, and is outputted as the output voltage of the secondary-side circuit from such a Vout terminal to a load.

Figure 2:
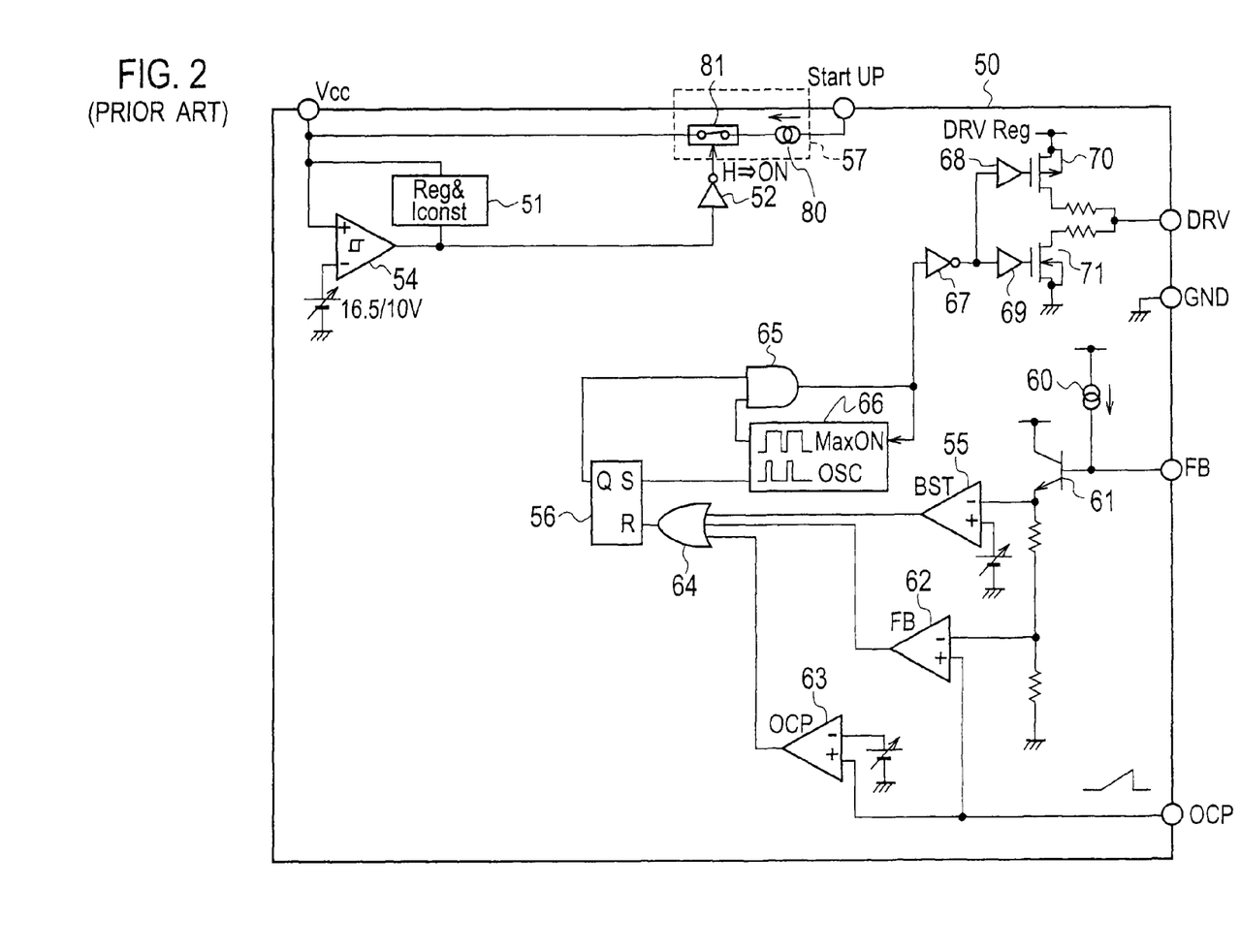
FIG. 2 is a circuit diagram showing a configuration of a control unit of the conventional switching power supply device.

Moreover, FIG. 2 is a circuit diagram showing an internal configuration of the control unit 50. As shown in FIG. 2, the control unit 50 includes an internal power supply 51, a first inverting circuit 52, a hysteresis comparator 54, a BST comparator 55, a flip-flop 56, a starting circuit 57, a constant current source 60, a transistor 61, an FB comparator 62, an OCP comparator 63, an OR gate 64, an AND gate 65, an oscillator circuit 66, a second inverting circuit 67, first and second drive circuits 68 and 69, and first and second switching elements 70 and 71.

The internal power supply 51 starts the control unit 50 based on power supplied from the Vcc terminal, and supplies, to the entirety of the control unit 50, power necessary for operations thereof. Moreover, the internal power supply 51 detects an output of the hysteresis comparator 54, and operates in the case where the output is a signal of a high (H) level, but stops operating and stops the supply of the power to the entirety of the control unit 50 in the case where the output is a low (L) level.

The hysteresis comparator 54 outputs the signal of the H level in the case where a voltage of the Vcc terminal is, for example, 16.5V or more, and outputs the signal of the L level when the voltage of the Vcc terminal thereafter drops to 10V or less.

The first inverting circuit 52 inverts the output signal of the hysteresis comparator 54 and outputs the inverted signal.

The starting circuit 57 is composed of a constant current source 80 and a switch 81, and flows therethrough a starting current for supplying the power to the internal power supply 51. Here, an input terminal of the constant current source 80 is connected to the StartUp terminal, and receives the supply of the power from the external Drain terminal. In the case where the switch 81 is turned on, the starting circuit 57 supplies the current, which is generated by the constant current source 80, through the Vcc terminal to the backup capacitor 12 of the auxiliary power supply circuit 30, and charges the backup capacitor 12. Moreover, the switch 81 in the starting circuit 57 switches on in the case where the output of the first inverting circuit 52 is the signal of the H level, and switches off in the case where the output of the first inverting circuit 52 is the signal of the L level. Hence, the starting circuit 57 turns on the switch 81 and supplies the starting current to the control unit 50 in the case where the voltage of the Vcc terminal drops to 10V or less and it is necessary to restart the control unit 50.

The constant current source 60 generates a feedback voltage, which comes from the secondary-side circuit, at the FB terminal by the phototransistor 9b of the photocoupler and the capacitor 10, which are connected to the FB terminal on the outside of the control unit 50.

In the transistor 61, a base thereof is connected to the FB terminal. The transistor 61 turns on in response to the feedback voltage of the FB terminal, and an emitter current flows therethrough.

The BST comparator 55 outputs a signal of the H level in the case where a voltage signal corresponding to an amount of the current flowing through the transistor 61 drops to a predetermined voltage value or less. When the load is light (or none), the capacitor 10 is discharged by operations of the LED 9a and the phototransistor 9b, and accordingly, the voltage of the FB terminal drops. Hence, the BST comparator 55 outputs a signal of the L level when the load is usual, and outputs the signal of the H level when the load is light.

The OCP terminal is connected to the Source terminal. A voltage corresponding to an amount of a current flowing through the switching element 5 is applied to the OCP terminal, and the OCP terminal outputs a voltage signal to the FB comparator 62 and the OCP comparator 63.

The FB comparator 62 outputs an H signal in the case where the voltage signal outputted from the OCP terminal exceeds a voltage signal corresponding to the amount of the current flowing through the transistor 61. In such a way, when a voltage value of the voltage signal inputted to the OCP terminal exceeds a voltage value corresponding to a feedback amount from the secondary-side circuit, which is shown on the FB terminal, the FB comparator 62 outputs the signal of the H level to an R terminal of the flip-flop 56 through the OR gate 64, turns off the switching element 5, and constantly controls an output voltage value of the secondary-side circuit.

In the case where the voltage signal inputted to the OCP terminal exceeds the predetermined voltage value, the OCP comparator 63 determines that the amount of the current flowing through the switching element 5 is an overcurrent, and outputs an H signal.

The OR gate 64 outputs an H signal to the R terminal of the flip-flop 56 in the case of having received such an H signal from any one of the BST comparator 55, the FB comparator 62 and the OCP comparator 63.

The oscillator circuit 66 generates a maximum duty cycle signal that decides a maximum duty cycle of the switching element 5, and then outputs the maximum duty cycle signal to the AND gate 65. Moreover, the oscillator circuit 66 generates a clock signal that decides an oscillation frequency of the switching element 5, and then outputs the clock signal to an S terminal of the flip-flop circuit 56. In such a way, the oscillator circuit 66 restricts an ON width of the switching element 5 when the load is excessive, and prevents the overcurrent from flowing therethrough.

The flip-flop 56 outputs a control signal from a Q terminal based on the clock signal inputted to the S terminal and on the signal inputted to the R terminal. An output terminal (Q terminal) of the flip-flop 56 is connected to an input terminal of the AND gate 65. Moreover, an output terminal of the AND gate 65 is connected to the first and second drive circuits 68 and 69 through the second inverting circuit 67. The first drive circuit 68 is connected to a gate terminal of the first switching element 70 made of a P-type MOSFET, and the second drive circuit 69 is connected to a gate terminal of the second switching element 71 made of an N-type MOSFET. The first and second switching elements 70 and 71 are driven alternately in response to an output of the AND gate 65, whereby the switching element 5 is controlled to be turned on/off.

Next, a description will be made of operations of the conventional switching power supply device. First, a sinusoidal voltage outputted by the alternating current power supply 1 is rectified by the bridge rectifier 2, passes through the capacitor 3, and is inputted to the Drain terminal of the switching element 5 through the primary winding P of the transformer 4. Meanwhile, since the switch 81 is turned on, the starting circuit 57 supplies a current to the backup capacitor 12 of the auxiliary power supply circuit 30 by the constant current source 80 and charges the backup capacitor 12 until the voltage of the Vcc terminal exceeds 16.5V. When the voltage of the Vcc terminal exceeds 16.5V, and the internal power supply 51 starts to operate and starts to supply the power to the control unit 50, then the starting circuit 57 turns off the switch 81, and stops supplying the starting current.

When the voltage of the Vcc terminal exceeds 16.5V, and the operations of the control unit 50 are started, then the switching element 5 starts a switching operation. Therefore, the energy starts to be supplied to the respective windings of the transformer 4, and currents flow through the secondary winding S1 and the auxiliary winding D.

The current flowing through the secondary winding S1 is rectified and smoothed by the rectifying diode 6 and the output capacitor 7, and thereby becomes a direct current. This direct current is outputted from the Vout terminal to the external load.

The switching operation of the switching element 5 is repeated, whereby the output voltage of the Vout terminal gradually rises. Then, when the output voltage of the Vout terminal reaches the reference voltage set in the error amplifier 8, the current flowing through the LED 9a of the photocoupler is increased. Then, a current flowing through the phototransistor 9b of the photocoupler is increased. Therefore, the capacitor 10 is discharged, and the voltage of the FB terminal drops. In such a way, the control unit 50 controls the switching element 5 to stabilize the output voltage of the Vout terminal. During a period while the switching operation of the switching element 5 is being stopped, as shown between a time t1 and a time t2 in FIG. 3, the voltage Vfb of the FB terminal rises in such a manner that a current generated by the constant current source 60 charges the capacitor 10.

The current flowing through the auxiliary winding D is rectified and smoothed by the diode 11 and the backup capacitor 12, is fully used as an auxiliary power supply of the control unit 50, and supplies the power to the Vcc terminal. As mentioned above, when the Vcc terminal reaches the starting voltage (16.5V) once, the switch 81 in the starting circuit 57 is turned off. Therefore, the supply of the power to the Vcc terminal after the start of the control unit 50 is performed by the auxiliary power supply circuit 30. A polarity of the auxiliary winding D is the same as that of the secondary winding S1, and accordingly, the voltage of the Vcc terminal becomes proportional to the output voltage of the Vout terminal.

When the load connected to the Vout terminal becomes light, the current flowing through the LED 9a of the photocoupler is increased in response to the error of the Vout voltage with respect to the reference voltage set in the error amplifier 8. Then, the current flowing through the phototransistor 9b of the photocoupler is increased. Therefore, the capacitor 10 is discharged, and the voltage of the FB terminal drops. In such a way, the flip-flop 56 of the control unit 50 is reset, and the control unit 50 stops the ON/OFF control for the switching element 5, or controls the switching element 5 to increase an off-duty time, that is, to perform an intermittent operation.

While the voltage of the FB terminal is dropping and the oscillation of the switching element 5 is being stopped, the current flowing through the LED 9a of the photocoupler is decreased. Then, following such a decrease, the current flowing through the phototransistor 9b of the photocoupler is decreased. In such a way, the capacitor 10 is charged by the constant current source 60, and the voltage of the FB terminal rises. The switching power supply device repeats the above-described operations, and when the load is light, controls the voltage by such an intermittent control to lengthen an OFF time of the switching element.

Figure 3:
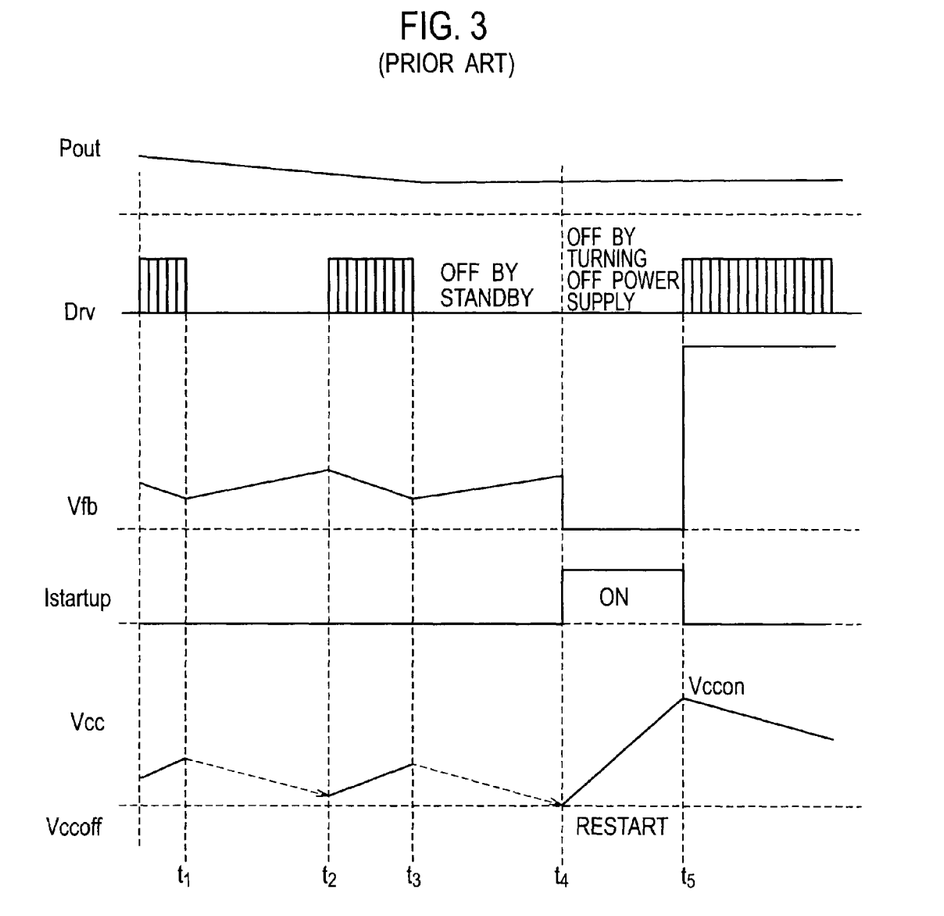
FIG. 3 is a waveform chart showing operations of the respective units of the conventional switching power supply device.

As shown in FIG. 3, when the switching element 5 is operating, the auxiliary winding D of the transformer 4 charges the backup capacitor 12 and raises the Vcc voltage. However, when the control for the switching element 5 is stopped, the backup capacitor 12 is discharged, and accordingly, the Vcc voltage drops. As mentioned above, when the load is none (or light), the ON/OFF operation of the switching element 5 is stopped, and accordingly, energy charged by the auxiliary winding D is small. Moreover, when such an oscillation stop time of the switching element 5 is lengthened, and the Vcc voltage continues to drop, and reaches Vccoff (10V) as a lowest operation voltage or less, then the internal power supply 51 is stopped. As a result, as shown at a time t4 in FIG. 3, a restarting operation of the control unit 50 becomes necessary. As described above, the fact that the control unit 50 stops the operation thereof and requires the restarting operation every time when the load becomes light during such a standby is disadvantageous for the equipment as the load, which requires a continuous supply of the power, and measures against the above-described fact are necessary.

In Patent Publication 1, a switching power supply is described, which is capable of reducing power consumption in the case where the load side is in a standby state. This switching power supply includes a current stabilizing circuit for the starting current between a positive line and negative line of the primary-side circuit. Then, when the load side is in the standby state, the switching power supply allows a starting constant current to operate intermittently in accordance with the intermittent operation of the switching power supply concerned. Specifically, the switching power supply concerned supplies power to the control circuit for the switching element by using the heretofore present auxiliary power supply circuit when the load is usual, and operates the current stabilizing circuit and supplies the power to the control circuit in the case where the off-duty time of the switching element is lengthened when the load is light. As a result, a voltage equal to or more than the lowest operation voltage required by the control circuit is maintained. In accordance with this switching power supply, a time while the starting constant current is being turned off can be lengthened with respect to a time while the starting constant current is being turned on. Moreover, the starting current is a constant current, whereby the starting current is not increased even if the input voltage of the power supply is raised, and power consumption caused by the starting current can be reduced. As a result, this switching power supply can contribute to energy saving during the standby time.

[Patent Publication 1] Japanese Patent Laid-Open Publication No. 2003-164150

SUMMARY OF THE INVENTION

However, the switching power supply described in Patent Publication 1 is one, in which the current stabilizing circuit is provided to the conventional switching power supply, and a transistor, a resistor, a diode and the like are also added to the auxiliary power supply circuit. Accordingly, the number of components is increased in the switching power supply. Therefore, upsizing of the device, a cost increase and an increase of a percent defective are brought about.

The present invention solves the above-mentioned problems inherent in the related art. It is an object of the present invention to provide a switching power supply device that prevents the stop of the switching element control unit, which follows the lowering of the supply of the power to the switching element control unit concerned when the load is light, without increasing the number of constituent components.

A switching power supply device according to a first aspect of the present invention includes: a transformer having a primary winding, a secondary winding and an auxiliary winding; a switching element connected to the primary winding of the transformer; a control circuit that performs an ON/OFF control for the switching element in a case where a voltage is inputted to the primary winding of the transformer, thereby induces voltages in the secondary winding and auxiliary winding of the transformer; a rectifying/smoothing circuit for rectifying and smoothing the voltage induced in the secondary winding of the transformer and outputting the voltage to a load; an auxiliary power supply circuit that rectifies and smoothes the voltage induced in the auxiliary winding of the transformer, and charges a capacitor owned by the auxiliary power supply circuit with the voltage to thereby supply power to the control circuit; and a starting circuit that supplies a current to the capacitor of the auxiliary power supply circuit in a case of starting the control circuit and in a case where the load is light and the switching element is turned off.

In accordance with the switching power supply device according to the first aspect of the present invention, the stop of the switching element control unit, which follows the lowering of the supply of the power to the switching element control unit concerned when the load is light, can be prevented without increasing the number of constituent components.

DETAILED DESCRIPTION OF THE EMBODIMENTS

A description will be made below in detail of embodiments of a switching power supply device of the present invention based on the drawings.

Embodiment 1

An entire configuration of a switching power supply device of Embodiment 1 of the present invention is similar to that of the conventional switching power supply device described by using FIG. 1. In Embodiment 1, the control unit 50 in FIGS. 1 and 2 is replaced by a control unit 50a described in FIG. 4. Here, the control unit 50a corresponds to a control circuit of the present invention, and controls ON/OFF of the switching element 5. Specifically, the switching power supply device according to Embodiment 1 of the present invention includes the switching element 5 connected to the primary winding P of the transformer 4. In the case where the voltage is inputted to the primary winding P of the transformer 4, the control unit 50*a* performs the ON/OFF control for the switching element 5, thereby rectifies and smoothes the voltage induced in the secondary winding S1 of the transformer 4, and outputs the voltage from the Vout terminal to the external load. Moreover, the auxiliary power supply circuit 30 is composed by connecting the diode 11 and the backup capacitor 12 to the auxiliary winding D. Then, the auxiliary power supply circuit 30 rectifies and smoothes the voltage induced in the auxiliary winding D of the transformer 4, charges the backup capacitor 12 provided in the auxiliary power supply circuit 30, and supplies the power to the Vcc terminal of the control unit 50*a*. Note that the same and equated ones as and to the constituent components in FIG. 2 are shown by reference numerals, which are the same as above, in FIG. 4 and the drawings showing the respective embodiments to be described later, and a duplicate description is omitted.

Figure 4:
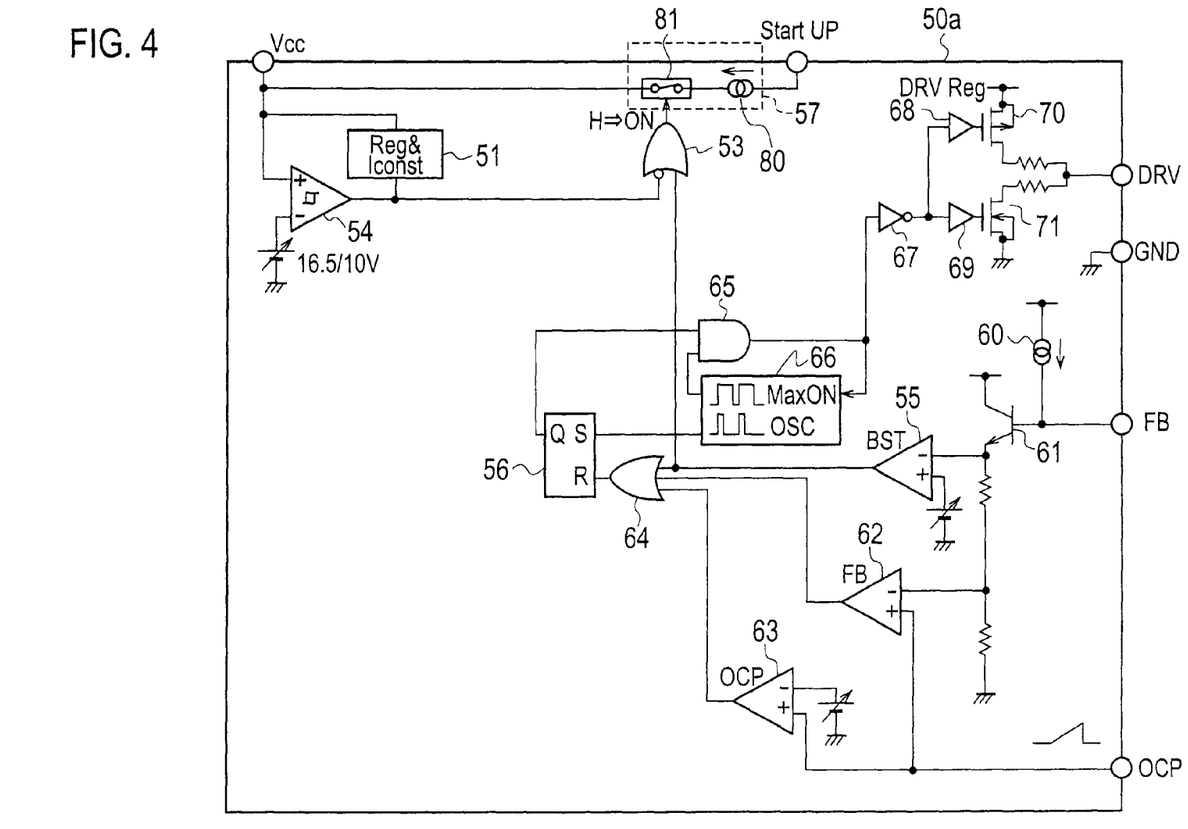
FIG. 4 is a circuit diagram showing a configuration of a control unit of a switching power supply device according to Embodiment 1 of the present invention.

First, a description will be made of a configuration of Embodiment 1. The control unit 50*a* of the switching power supply device of Embodiment 1 includes an OR gate 53 instead of the first inverting circuit 52 in the control unit 50 of the conventional switching power supply device shown in FIG. 2.

An inverted output of the hysteresis comparator 54 and an output of the BST comparator 55 are inputted to input terminals of the OR gate 53. Specifically, in the case where a signal of the L level is outputted by the hysteresis comparator 54, or in the case where a signal of the H level is outputted by the BST comparator 55, the OR gate 53 outputs a signal of the H level, and turns on the switch 81.

Hence, in the case of starting the control unit 50*a*, and in the case where the load is light and the switching element 5 is turned off, the starting circuit 57 supplies a current to the backup capacitor 12 of the auxiliary power supply circuit 30 to thereby charge the backup capacitor 12, and raises the Vcc terminal voltage.

Next, a description will be made of functions of Embodiment 1 configured as described above. First, the sinusoidal voltage outputted by the alternating current power supply 1 is rectified by the bridge rectifier 2, passes through the capacitor 3, and is inputted to the Drain terminal of the switching element 5 through the primary winding P of the transformer 4. Meanwhile, since the switch 81 is turned on, the starting circuit 57 supplies the current to the backup capacitor 12 of the auxiliary power supply circuit 30 by the constant current source 80 and charges the backup capacitor 12 until the voltage of the Vcc terminal exceeds 16.5V. When the voltage of the Vcc terminal exceeds 16.5V, and the internal power supply 51 starts to operate and starts to supply the power to the control unit 50, then the starting circuit 57 turns off the switch 81, and stops supplying the starting current.

When the voltage of the Vcc terminal exceeds 16.5V, and the operations of the control unit 50 are started, then the switching element 5 starts the switching operation. Then, the energy starts to be supplied to the respective windings of the transformer 4, and the currents flow through the secondary winding S1 and the auxiliary winding D.

The current flowing through the secondary winding S1 is rectified and smoothed by the rectifying diode 6 and the output capacitor 7, and thereby becomes the direct current. This direct current is outputted from the Vout terminal to the external load.

When the load is usual, the switching element 5 operates in a continuous oscillation operation. An output voltage stabilizing operation at this time, which is performed by the feedback using the error amplifier 8 and the LED 9*a* and phototransistor 9*b* of the photocoupler, is similar to that of the related art described with reference to FIG. 1 and FIG. 2, and a duplicate description is omitted.

Next, a description will be made of operations of the switching power supply device of Embodiment 1 when the load is light (or none). As the load connected to the Vout terminal is becoming gradually lighter, the current flowing through the LED 9*a* of the photocoupler is increased in response to the error of the Vout voltage with respect to the reference voltage set in the error amplifier 8. Then, the current flowing through the phototransistor 9*b* of the photocoupler is increased. Therefore, the capacitor 10 is discharged, and the voltage of the FB terminal drops. In such a way, the BST comparator 55 in the control unit 50*a* outputs the signal of the H level. The output signal of the H level, which is outputted by the BST comparator 55, is inputted to the R terminal of the flip-flop 56. Then, the flip-flop 56 is reset, and the oscillation of the switching element 5 is stopped. At the same time, the output signal of the H level, which is outputted by the BST comparator 55, sets the output of the OR gate 53 at the H level, and brings the switch 81 into conduction.

Figure 5:
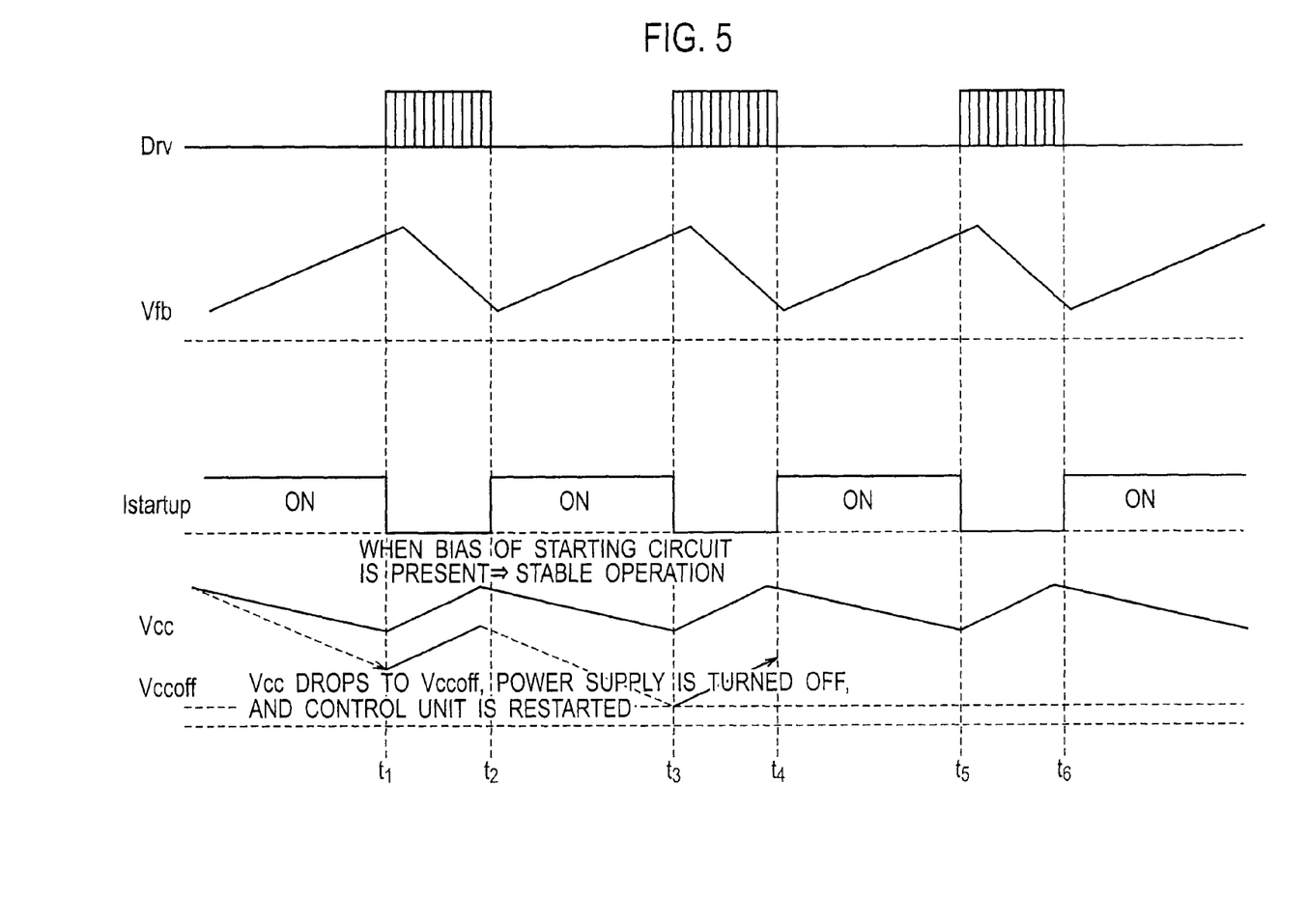
FIG. 5 is a waveform chart showing operations of the respective units of the switching power supply device according to Embodiment 1 of the present invention.

Hence, for example, as shown between a time t2 and a time t3 in FIG. 5, the starting circuit 57 supplies a current (Istartup) to the Vcc terminal through the StartUp terminal, and charges the backup capacitor 12. As a result, a falloff of the Vcc terminal voltage, which is as shown by a broken line in FIG. 5, is suppressed.

After the voltage of the FB terminal drops and the oscillation of the switching element 5 is stopped at the time t2, the voltage of the secondary-side circuit drops, and the current flowing through the LED 9*a* of the photocoupler is decreased. Then, following this current decrease, the current flowing through the phototransistor 9*b* of the photocoupler is decreased. In such a way, the capacitor 10 is charged from the constant current source 60, and the voltage of the FB terminal rises. As a result, at the time t3, the BST comparator 55 outputs the signal of the L level. In such a way, the control unit 50*a* resumes the ON/OFF control for the switching element 5. At the same time, the OR gate 53 outputs the signal of the L level to thereby turn off the switch 81, and stops the current supply made by the starting circuit 57. Note that the current of the starting circuit 57 is set larger than the current of the control unit 50*a*, whereby a voltage inclination of the falloff of the Vcc terminal voltage is changed.

The starting circuit 57 in the case of the related art described with reference to FIG. 3 supplies the current only at the time of the first starting or only at the time of the restarting after the power supply is turned off. However, unlike in the case of the related art, the starting circuit 57 of the switching power supply device of Embodiment 1 supplies the current not only at the time of the starting but also in the case where the control for the switching element 5 is turned off when the load is light.

As mentioned above, in accordance with the switching power supply device according to Embodiment 1 of the present invention, the stop of the internal power supply 51 and the stop of the control unit 50*a*, which follow the lowering of the supply of the power to the control unit 50*a* (lowering of the Vcc terminal voltage) when the load is light (or none), can be prevented without increasing the number of constituent components in the device. Therefore, the switching power supply device of Embodiment 1 can prevent discontinuation of the supply of the power to the load, which may be caused by the restarting operation of the control unit 50*a*, and can continue the stable supply of the power.

Moreover, in the case where the load is light and the switching element 5 is turned off, the starting circuit 57 supplies the current to the Vcc terminal through the StartUp terminal, and charges the backup capacitor 12, and thereby suppresses the falloff of the Vcc terminal. Therefore, not only the above-mentioned effects are obtained, but also an effect of loss reduction, which is brought by operating the starting circuit 57 only when the oscillation of the switching element 5 is stopped, can be obtained.

Furthermore, the starting circuit 57 is connected to the drain terminal of the switching element 5 through the StartUp terminal. Specifically, both of the switching element 5 and the starting circuit 57 use the power supplied to the Drain terminal through the primary winding P; however, this does not cause a problem since both do not operate simultaneously as mentioned above, and Embodiment 1 also has an advantage that the terminal can be shared.

Moreover, as a modification example of Embodiment 1, a configuration can also be adopted, in which the constant current source 80 in the starting circuit 57 switches the amount of the current flown through the Vcc terminal to a large value based on the output of the BST comparator 55 in the case where the output concerned is the signal of the H level. Specifically, the starting circuit 57 increases the amount of the current supplied in the case where the load is light and the switching element 5 is turned off (case where the output signal of the BST comparator 55 is the H level) with respect to the amount of the current supplied in the case of starting the control unit 50a (case where the output signal of the hysteresis comparator 54 is the L level).

In such a way, the starting circuit 57 can further suppress the falloff of the Vcc terminal voltage, and accordingly, can contribute to the stabilization of the operations of the internal power supply 51 and the control unit 50a. Moreover, when a consideration is made for the time of an abnormal operation in which the Vcc terminal and GND terminal of the control unit 50a cause a short circuit, the hysteresis comparator 54 will then always output the signal of the L level. During this while, the switch 81 in the starting circuit 57 will continue to turn on based on the signal concerned. Therefore, in the case where the amount of the current of the constant current source 80 is set always large, there occurs a problem that a heating value of the starting circuit 57 is increased to result in a lack of safety. However, in this modification example, the starting circuit 57 increases the amount of the supplied current only in the case where the load is light and the switching element 5 is turned off (case where the output signal of the BST comparator 55 is the H level). Therefore, this modification example has an advantage that heat generation of the starting circuit 57 at the time of such abnormality as described above is suppressed.

Furthermore, when a consideration is made for the case where the Vout terminal as the output terminal of the switching power supply device is short-circuited to the Gnd terminal, even if the switching element 5 performs the ON/OFF operation, the auxiliary winding D hardly generates the voltage, and the backup capacitor 12 is hardly charged. Hence, when the Vcc terminal voltage drops regardless of the switching operation, and reaches Vccoff (10V) as the lowest operation voltage, the internal power supply 51 is stopped, and the restarting operation of the control unit 50a becomes necessary. Thereafter, the starting circuit 57 charges the backup capacitor 12 to thereby restart the control unit 50a; however, since the charge by the auxiliary winding D is hardly performed as described above, the control unit 50a will repeat the stopping/restarting (resuming of the switching operation). In the case where the amount of the current of the constant current source 80 is set always large, a time from the stopping of the control unit 50a to the restarting thereof is shortened, and the switching element 5 causes the problem that the heating value by the switching operation is increased to result in a lack of the safety. However, in this modification example of Embodiment 1, the starting circuit 57 increases the amount of the current supplied only in the case where the load is light and the switching element 5 is turned off (case where the output signal of the BST comparator 55 is the H level). Therefore, the heat generation of the switching element 5 at the time of the short circuit of the output terminal, which is as described above, is suppressed.

Moreover, as another modification example of Embodiment 1, a configuration can also be adopted, in which the hysteresis comparator 54 switches the lowest operation voltage Vccoff, which is preset in the hysteresis comparator 54, to a value smaller than the initial lowest operation voltage (10V in Embodiment 1) based on the output of the BST comparator 55 in the case where the output concerned is the signal of the H level. Specifically, in the case where the load is light and the switching element 5 is turned off (case where the output signal of the BST comparator 55 is the H level), the control unit 50a sets the set voltage value for stopping the operation of the control unit 50a at a value (for example, 8 to 9V) lower than the preset value (10V in Embodiment 1). In such a way, even in the case where an unstable operation of the starting circuit 57 occurs, the control unit 50a can prevent the Vcc terminal voltage from falling down below the lowest operation voltage Vccoff, and this can contribute to the stabilization of the operations of the internal power supply 51 and the control unit 50a.

Note that the switching power supply device of Embodiment 1 of the present invention is not limited to the flyback type of the PWM control method, and is applicable to a flyback type and forward type of the pseudo-resonance control method, and is applicable to all of the switching power supply devices, each of which supplies a control power supply from the auxiliary winding of the transformer. This is also applied to a switching power supply device of Embodiment 2 to be described later.

Embodiment 2

An entire configuration of the switching power supply device of Embodiment 2 of the present invention is similar to those of the conventional switching power supply device and the switching power supply device of Embodiment 1. In Embodiment 2, the control unit 50 in FIGS. 1 and 2 is replaced by a control unit 50b described in FIG. 6.

Figure 6:
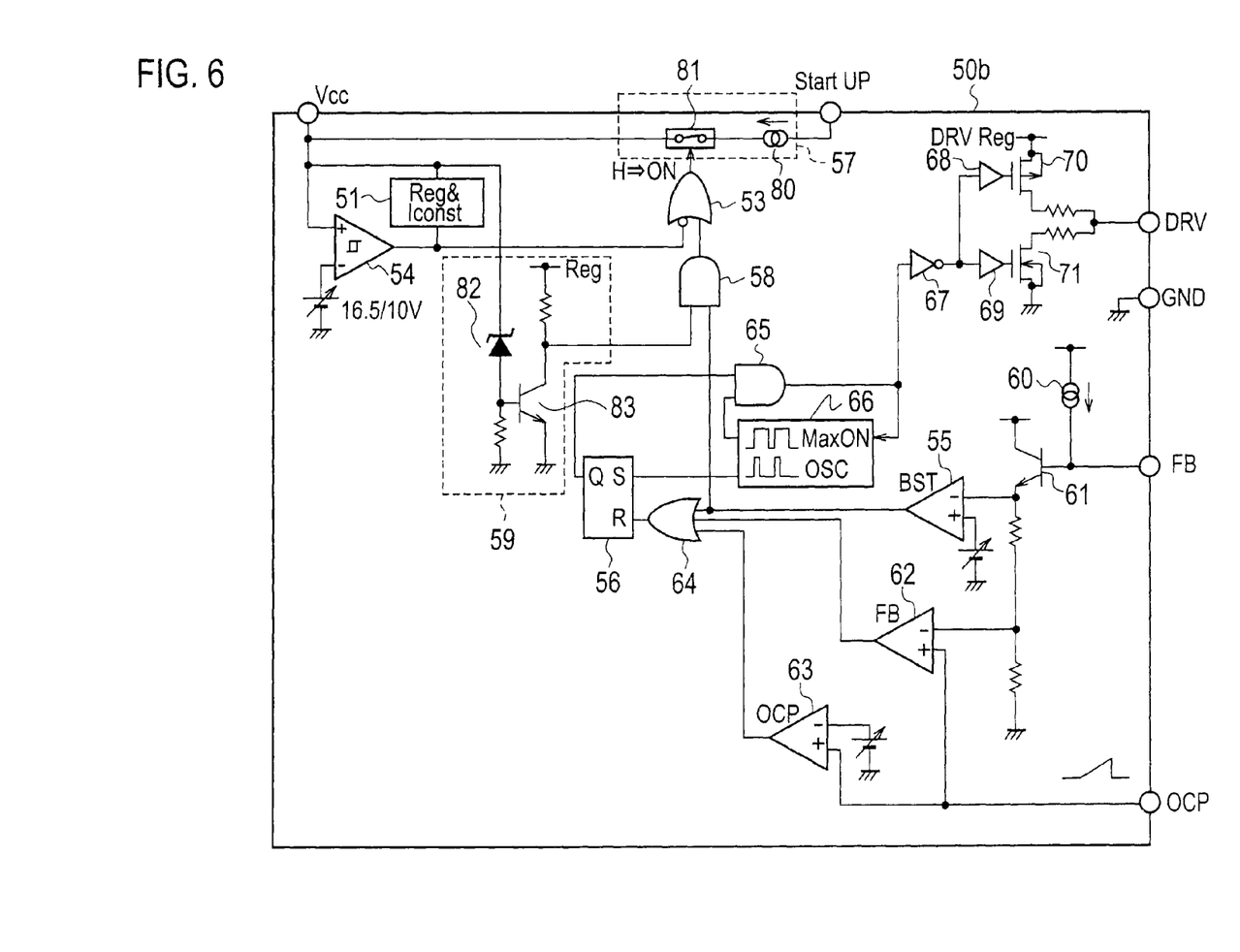
FIG. 6 is a circuit diagram showing a configuration of a control unit of a switching power supply device according to Embodiment 2 of the present invention.

First, a description will be made of a configuration of Embodiment 2. With respect to the configuration owned by the control unit 50a of the switching power supply device of Embodiment 1, which is shown in FIG. 4, the control unit 50b of the switching power supply device of Embodiment 2 has a configuration to which an AND gate 58 and a determination circuit 59 are added.

The AND gate 58 is provided between the output terminal of the BST comparator 55 and the input terminal of the OR gate 53. Then, in the case where both of an output signal by the determination circuit 59 and the output signal of the BST comparator 59 are signals of the H level, the AND gate 58 outputs a signal of the H level to the OR gate 53.

The determination circuit 59 is connected to the Vcc terminal and an input terminal of the AND gate 58, and determines whether or not the value of the voltage (Vcc terminal voltage value) supplied to the control unit 50b by the auxiliary power supply circuit 30 is a predetermined voltage value or more. The determination circuit 59 is composed of a constant voltage source Reg, a switching element 83 and a Zener diode 82, and outputs the signal of the H level to the AND gate 58 in the case where the Vcc terminal voltage is lower than a breakdown voltage of the Zener diode 82. Here, when the breakdown voltage of the Zener diode 82 is Vccbias, the Vccbias just needs to be set at a value that is smaller than the starting voltage value for starting the switching power supply device and is larger than the lowest operation voltage. In Embodiment 2, the starting voltage value is 16.5V, and the lowest operation voltage value is 10V. Therefore, the value of the breakdown voltage of the Zener diode should be set so as to become, for example, approximately 11V or 12V.

The inverted output of the hysteresis comparator 54 and the output of the AND gate 58 are inputted to an input terminal of the OR gate 53. Specifically, in the case where the signal of the L level is outputted by the hysteresis comparator 54, or in the case where the signal of the H level is outputted by the AND gate 58, the OR gate 53 outputs the signal of the H level to thereby turn on the switch 81.

Hence, in the case where the load is light and the switching element 5 is turned off (case where the output signal of the BST comparator 55 is the H level), only when a determination result by the determination circuit 59 shows the predetermined voltage value or less (when the output signal of the determination circuit 59 is the H level), the starting circuit 57 supplies the current to the backup capacitor 12 of the auxiliary power supply circuit 30, and charges the backup capacitor 12, thereby raises the Vcc terminal voltage.

Other configurations are similar to those of Embodiment 1, and a duplicate description is omitted.

Next, a description will be made of functions of Embodiment 2 configured as described above. Operations, in which the control unit 50b starts to operate when the Vcc terminal voltage exceeds 16.5V, and stabilization of the output voltage of the secondary-side circuit by the feedback is achieved, are similar to those of Embodiment 1, and a duplicate description is omitted.

Next, a description will be made of operations of the switching power supply device of Embodiment 2 when the load is light (or none). As the load connected to the Vout terminal is becoming gradually lighter, the current flowing through the LED 9a of the photocoupler is increased in response to the error of the Vout voltage with respect to the reference voltage set in the error amplifier 8. Then, the current flowing through the phototransistor 9b of the photocoupler is increased. Therefore, the capacitor 10 is discharged, and the voltage of the FB terminal drops. In such a way, the BST comparator 55 in the control unit 50b outputs the signal of the H level. The signal of the H level is inputted to the R terminal of the flip-flop 56, thereby resets the flip-flop 56, and stops the oscillation of the switching element 5 (for example, time t3 in FIG. 7). At the same time, the signal of the H level, which is outputted by the BST comparator 55, is inputted to the input terminal of the AND gate 58.

At this time, in the case where the determination result by the determination circuit 59 is the predetermined voltage value (Vccbias) or less (case where the output signal of the determination circuit 59 is the H level), the AND gate 58 outputs the signal of the H level, and turns on the switch 81 through the OR gate 53. However, during a period between the time t3 and a time t4 in FIG. 7, the switch 81 keeps on being turned off since the Vcc voltage value is a value higher than the Vccbias. Therefore, the starting circuit 57 does not supply the current (Istartup) to the Vcc terminal during the period between the time t3 and the time t4.

Figure 7:
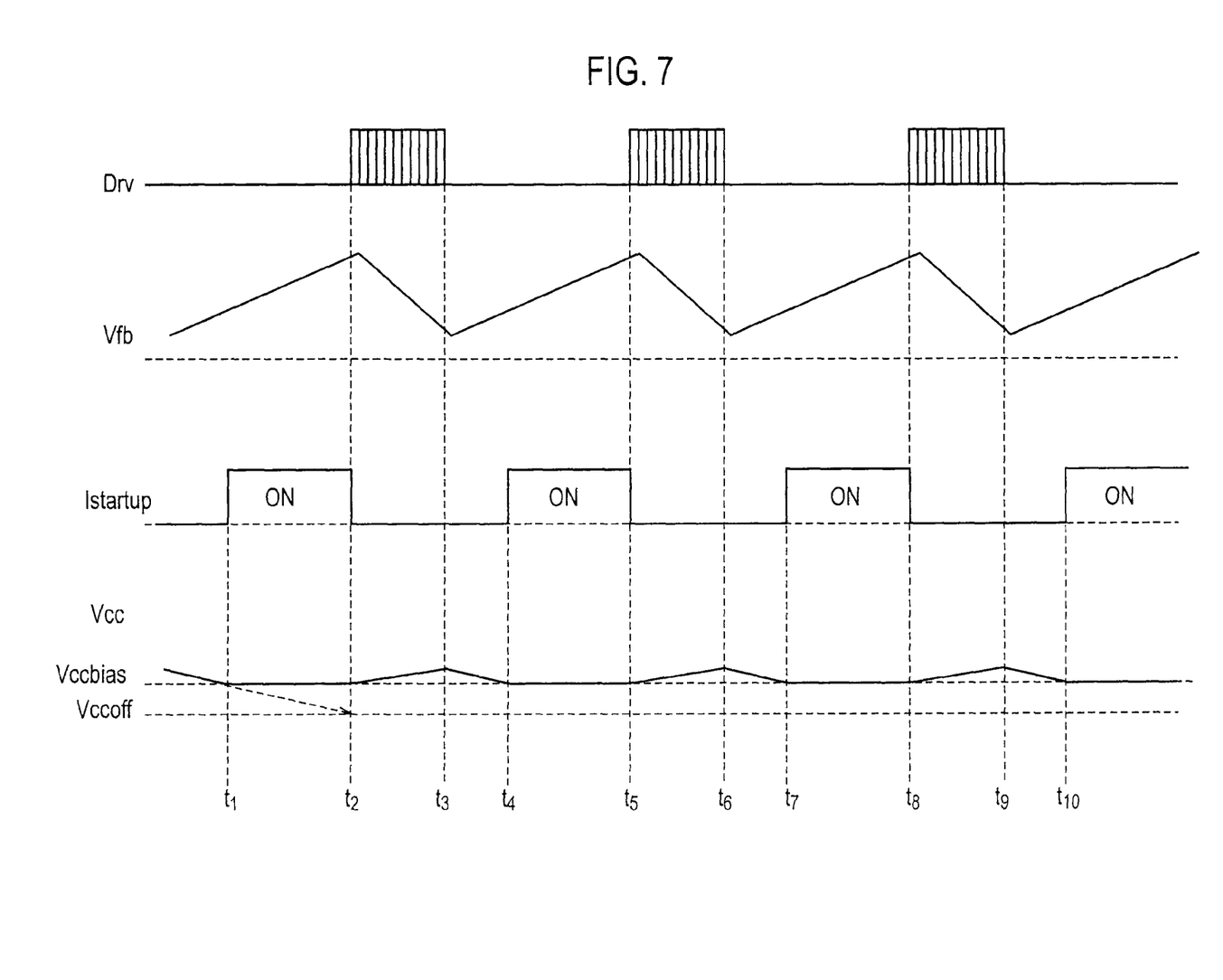
FIG. 7 is a waveform chart showing operations of the respective units of the switching power supply device according to Embodiment 2 of the present invention.

Referring to FIG. 7, the Vcc terminal voltage drops to the value of the Vccbias at the time t4. Therefore, the determination circuit 59 outputs the signal of the H level to the AND gate 58, and the switch 81 is controlled to be turned on through the OR gate 53. As a result, the starting circuit 57 starts to supply the current (Istartup) to the Vcc terminal, and charges the backup capacitor 12. In such a way, the falloff of the Vcc terminal voltage is suppressed.

After the voltage of the FB terminal drops and the oscillation of the switching element 5 is stopped at the time t3, the voltage of the secondary-side circuit drops, and the current flowing through the LED 9a of the photocoupler is reduced. Then, following this current decrease, the current flowing through the phototransistor 9b of the photocoupler is decreased. In such a way, the capacitor 10 is charged from the constant current source 60, and the voltage of the FB terminal rises.

As a result, the BST comparator 55 outputs the signal of the L level. In such a way, the control circuit 50a resumes the ON/OFF control for the switching element 5 at a time t5. At the same time, the AND gate 58 outputs the signal of the L level, turns off the switch 81 through the OR gate 53, and stops the supply of the current, which is performed by the starting circuit 57.

The starting circuit 57 in Embodiment 1 supplies the current in the case where the control for the switching element 5 is turned off when the load is light. However, in addition to the operation conditions of the starting circuit 57 in Embodiment 1, the starting circuit 57 in Embodiment 2 supplies the current to the Vcc terminal further only in the case where the Vcc terminal voltage is the predetermined voltage value or less, and accordingly, can shorten the operation time in comparison with the case of Embodiment 1.

As mentioned above, in accordance with the switching power supply device according to Embodiment 2 of the present invention, in addition to the effects of Embodiment 1, the ON time of the switch 81 of the starting circuit 57 can be shortened. Since the starting circuit 57 is a dropper circuit in which a loss is relatively large, the loss can be reduced by shortening the ON time of the switch 81.

Moreover, in a similar way to the case of Embodiment 1, the starting circuit 57 of Embodiment 2 is connected to the drain terminal of the switching element 5 through the StartUp terminal, and the switching element 5 and the starting circuit 57 do not operate simultaneously, and accordingly, Embodiment 2 also has an advantage that the terminal can be shared.

Also in Embodiment 2, two modification examples can be conceived in a similar way to the case of Embodiment 1. As one of the modification examples, a configuration can also be adopted, in which the constant current source 80 in the starting circuit 57 switches the amount of the current flown through the Vcc terminal to a large value based on the output of the AND gate 58 in the case where the output concerned is the signal of the H level. Specifically, the starting circuit 57 increases the amount of the current supplied in the case where the load is light, the switching element 5 is turned off (the output signal of the BST comparator 55 is the H level) and the Vcc terminal voltage is the predetermined voltage value or less (the output signal of the determination circuit 59 is the H level) with respect to the amount of the current supplied in the case of starting the control unit 50b (case where the output signal of the hysteresis comparator 54 is the L level).

In such a way, the starting circuit 57 can further suppress the falloff of the Vcc terminal voltage, and accordingly, can contribute to the stabilization of the operations of the internal power supply 51 and the control unit 50b. Moreover, in a similar way to the case of Embodiment 1, when a consideration is made for the time of the abnormal operation in which the Vcc terminal and GND terminal of the control unit 50b cause the short circuit, the starting circuit 57 of this modification example, which increases the amount of the supplied current only in the case where the output signal of the AND gate 58 is the H level, has an advantage that the heat generation of the starting circuit 57 itself at the time of the abnormal operation concerned can be suppressed. Furthermore, when a consideration is made for the case where the Vout terminal as the output terminal of the switching power supply device is short-circuited to the Gnd terminal, the starting circuit 57 of this modification example increases the amount of the supplied current only in the case where the output signal of the AND gate 58 is the H level, and accordingly, has an advantage that the heat generation of the switching element 5 at the time of the short circuit of the output terminal concerned can be suppressed.

Moreover, as the other modification example, a configuration can also be adopted, in which the hysteresis comparator 54 switches the lowest operation voltage Vccoff, which is set in the hysteresis comparator 54, to a value smaller than the initial lowest operation voltage (10V in Embodiment 2) based on the output of the AND gate 58 in the case where the output concerned is the signal of the H level. Specifically, in the case where the load is light and the switching element 5 is turned off (case where the output signal of the BST comparator 55 is the H level) and in the case where the Vcc terminal voltage is the predetermined voltage value or less (case where the output signal of the determination circuit 59 is the H level), the control unit 50*b* sets the set voltage value for stopping the operation of the control unit 50*b* at a value (for example, 8 to 9V) lower than the preset value (10V in Embodiment 2). In such a way, even in the case where an unstable operation of the starting circuit 57 occurs, the control unit 50*b* can prevent the Vcc terminal voltage from falling down below the lowest operation voltage Vccoff, and this can contribute to the stabilization of the operations of the internal power supply 51 and the control unit 50*b*.

What is claimed is:

1. A switching power supply device, comprising:
   a transformer comprising a primary winding, a secondary winding and an auxiliary winding;
   a switching element connected to the primary winding of the transformer;
   a control circuit that performs an ON/OFF control for the switching element in a case where a voltage is inputted to the primary winding of the transformer, thereby induces voltages in the secondary winding and auxiliary winding of the transformer;
   a rectifying/smoothing circuit for rectifying and smoothing the voltage induced in the secondary winding of the transformer and outputting the voltage to a load;
   an auxiliary power supply circuit that rectifies and smoothes the voltage induced in the auxiliary winding of the transformer, and charges a capacitor owned by the auxiliary power supply circuit with the voltage to thereby supply power to the control circuit;
   a starting circuit that supplies a current to the capacitor of the auxiliary power supply circuit in a case of starting the control circuit and in a case where the load is light and the switching element is turned off; and
   a determination circuit that determines whether or not a value of a voltage supplied to the control circuit by the auxiliary power supply circuit is a predetermined voltage value or less,
   wherein, in the case where the load is light and the switching element is turned off, the starting circuit supplies the current to the capacitor of the auxiliary power supply circuit only in a case where a determination result made by the determination circuit shows the predetermined voltage value or less.

2. The switching power supply device according to claim 1, wherein the starting circuit is connected to a drain terminal of the switching element.

3. The switching power supply device according to claim 1, wherein the starting circuit increases an amount of a current supplied in the case where the load is light and the switching element is turned off with respect to an amount of a current supplied in the case of starting the control circuit.

4. The switching power supply device according to claim 1, wherein, in the case where the load is light and the switching element is turned off, the control circuit sets a set voltage value for stopping an operation of the control circuit at a value lower than a preset value.

\* \* \* \* \*